Dec. 27, 1960  D. H. WHITE ET AL  2,966,399
SAFETY SYSTEMS FOR FURNACE
Filed Sept. 3, 1957
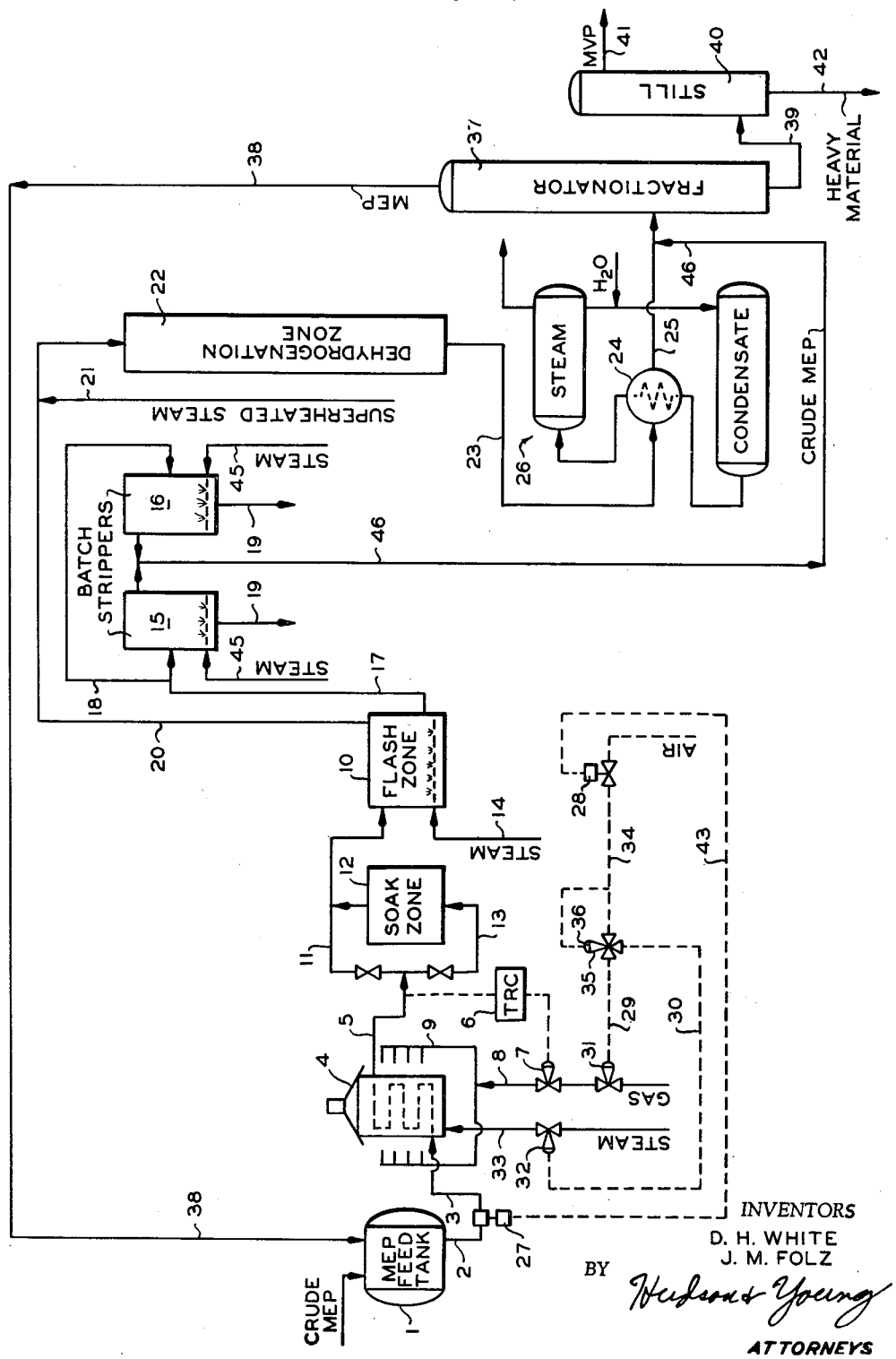
INVENTORS
D. H. WHITE
J. M. FOLZ
BY Hudson & Young
ATTORNEYS

United States Patent Office 2,966,399
Patented Dec. 27, 1960

2,966,399
SAFETY SYSTEMS FOR FURNACE

Donald H. White and John M. Folz, Bartlesville, Okla., assignors to Phillips Petroleum Company, a corporation of Delaware Filed Sept. 3, 1957, Ser. No. 681,853

7 Claims. (Cl. 23—262)

This invention relates to an improved safety system for a furnace. In one of its aspects, it relates to a safety system as applied to a tube furnace. In still another of its aspects, it relates to a safety system as applied to the purification system of alkylpyridines.

This is a continuation-in-part of our application Serial No. 392,274, filed November 16, 1953, for "Alkenylpyridine Synthesis."

While the safety system of this invention is useful in furnaces in general, especially those furnaces wherein a fluid subject to charring or otherwise decomposing on being excessively heated is passed through tubes which are heated externally, the invention is particularly useful in a furnace wherein alkylpyridines are being heated prior to flashing in an alkylpyridine purification system.

Alkenylpyridines have received much attention in recent years as a source of monomeric materials for the production of plastics. Although alkenylpyridines can be produced commercially by several methods, the method which is most important commercially is the direct catalytic dehydrogenation of alkylpyridine to the corresponding alkenylpyridine. For example, 2-methyl-5-ethylpyridine can be dehydrogenated to produce the corresponding 2-methyl-5-vinylpyridine. Other examples of alkylpyridines which can be dehydrogenated to form the corresponding alkenylpyridines are 2,4-diethylpyridine, 2 - ethylpyridine, 2,5 - diethylpyridine, 3 - ethylpyridine, 3-propylpyridine, 2-n-amylpyridine, 3-ethyl-4-methylpyridine, 5-isopropyl-2-methylpyridine, β-collodine and similar compounds. Also, mixtures of alkylpyridines may be dehydrogenated to give a mixture of the corresponding alkenylpyridines.

The alkylpyridines are best prepared by the condensation of a carbonyl compound, that is, an aldehyde, ketone or a derivative thereof, with ammonia. Examples of carbonyl compounds which can be condensed with ammonia to form pyridine derivatives are aldehydes and ketones, i.e., crotonaldehydes, benzalacetophenone, benzaldiacetophenone, ethylidene acetone, p-chlorobenzaldiacetophenone, α-acetylbutyrolactone, cyclopentanone, tetrahydropyrone, and β-cyclohexylpropionaldehyde.

Alkenylpyridines can be produced by the condensation of a carbonyl with ammonia and the subsequent dehydrogenation of the alkylpyridine.

One difficulty encountered in the dehydrogenation of alkylpyridines is the fouling of the dehydrogenation catalyst due to certain impurities, such as polymers, vinylpyridines and picolines, which are produced in small percentages during the production of the alkylpyridines. The alkylpyridine can be separated from these impurities by distillation or evaporation, however either some alkylpyridine will be lost with the heavy ends or some heavy ends will be distilled off with the alkylpyridines.

As was hereinbefore stated, the alkylpyridine, as produced, contains certain heavy impurities mixed therein. It is necessary to remove these impurities from the alkylpyridine prior to dehydrogenation, since they tend to poison the dehydrogenation catalyst and to foul up the dehydrogenation unit. It is believed that these materials also promote polymerization of alkenylpyridines. Most of the alkylpyridine is recovered by flash evaporation, leaving as a bottoms product these heavy impurities along with as much as 50 percent alkylpyridine dissolved therein. It is desirable to recover this material for subsequent dehydrogenation.

Where the alkylpyridine is separated from the undesirable components by flash evaporation, the material generally passes through a heater and is then flashed into the flash or evaporation zone. Should the flow of new material cease for any cause, the material in the coils of the heater becomes charred due to the high temperature of such heater. The cleaning of such tubes is then a difficult and expensive operation.

We have discovered an improved method of preparing alkylpyridines for dehydrogenation and at the same time recovering substantially all of the usable alkylpyridine. We have also discovered a method of preventing damage to heat exchange tubes in a heater when the flow of materials through said heater should be interrupted.

An object of this invention is to provide a means of preventing damage to heat exchange tubes in a heat exchange unit when the flow of material through said tubes should be interrupted. Other objects and advantages will be obvious to those skilled in the art upon reading this specification and the attached claims.

According to this invention, when the flow of fluids to a heat exchange zone drops below a predetermined minimum, the heat source is cut off and a coolant is introduced to the heat source side of the heat exchanger.

By operating according to our invention, damage to the interior of heat exchanger due to excessive heat rise when flow of material being heated drops is prevented. That is, when heat is being supplied to the exterior of tubes, for example, the flow of material through said tubes carries the heat out and the temperature is controlled. Now if the flow of material ceases, the shutting off of the heat source will not necessarily prevent tube damage since, the material present in the tubes will continue to soak up residual heat. By the practice of this invention, a quench material is sprayed into the heating chamber and cools the heat exchange means. This quenching agent can be any non-deleterious, non-inflammable, non-toxic material, but will most generally be steam. In a low temperature furnace, water could be employed, however, in most instances, a liquid, such as water, might shock crack the exchanger. Air, nitrogen and other gas can be employed, however, the heat capacity of these materials is comparatively low and therefore steam is most generally employed.

The purification of alkylpyridines according to the aforementioned copending application comprises heating a crude alkylpyridine from the alkylpyridine production zone in a heating zone and passing the heated material to a flash zone wherein live steam is added. The vaporized alkylpyridine in the flash zone is mixed with superheated steam and passed into a dehydrogenation zone wherein the alkenylpyridine is formed. The unvaporized fluid from the flash zone, composed of heavy materials with alkylpyridines dissolved therein, is passed into a steam stripper wherein the dissolved alkylpyridine is exhaustively stripped along with some of the heavier polymers. The stripped 2-methyl-5-ethylpyridine (MEP) effluent containing some heavy material is added to the effluent from the dehydrogenation zone and the mixture further purified. As was indicated hereinbefore, the heavy ends from the flash evaporator contain 50 or more percent heavy materials with alkylpyridine dissolved therein. This material cannot be added directly to the effluent from the dehydrogenation zone since such a large percentage of heavy material cannot be economically handled in the alkenylpyridine purifying system. The said strippers are used to recover more than 95 percent of the alkylpyridine from the heavy materials, but in so doing, some heavy materials of intermediate boiling range will also go off with the alkylpyridine and, for that reason, this material is mixed with the effluent from the dehydrogenation zone.

Of the many alkenylpyridines known to the art, 2-methyl-5-vinylpyridine is of the most importance commercially at the present time. We will therefore describe our invention in terms of 2-methyl-5-ethylpyridine (MEP) and the corresponding dehydrogenation product 2-methyl-5-vinylpyridine (MVP).

Our invention can best be described by referring to the attached drawing which is made a part of this disclosure. The drawing is a schematic flow diagram showing one embodiment of our invention.

Referring to the drawing, crude MEP is removed from MEP storage or feed tank 1 via conduits 2 and 3 to heating zone 4 wherein the temperature of the MEP is raised to a level where some vaporization takes place, usually in the range between 350–400° F. The pressure in this zone will usually be in the range between 10 and 20 p.s.i.g. In the embodiment shown, the movement of material is dependent upon pressure drop throughout the system and, for that reason, the pressure in the heating zone will be dependent upon the pressure required to push the material through the system less the pressure drop in the flash zone, as will be hereinafter described.

The heated MEP is removed from heating zone 4 via conduit 5. A temperature-recorder-controller 6 is responsive to the temperature of the MEP flowing in conduit 5. The controller 6 is operatively connected to a valve 7 which controls the flow of gas through conduit 8 to burners 9 in heater 4.

It is pointed out that the fluid in conduit 5 can be partially in the liquid state and partially in the varporous state over a small range of temperature since the MEP is not pure but contains some heavy oils. The hot crude MEP in conduit 5 can go directly to flash zone 10 via conduit 11 or it can pass through soak zone 12 via conduit 13. The soak zone is provided to allow time for polymerization of vinylpyridines which may be present. We have found that substantially all of the 3-vinylpyridine present in crude MEP will be sufficiently polymerized by the time the material reaches the flash zone 10 without the use of such a soaking zone.

The pressure is dropped to between 5 to 10 pounds per square inch gage (p.s.i.g.) in the flash zone causing most of the MEP to vaporize. The amount of vaporization is usually between 90 and 97 percent of the total MEP. The remaining MEP is dissolved in the heavy material which settles in the bottom of the said flash zone.

A small amount of steam is admitted to the bottom of the flash zone via conduit 14. This steam is used to strip the heavy material which goes to batch strippers 15 or 16 via conduits 17 and 18. These batch strippers are so arranged that one stripper can be fed while the material in the other stripper is being exhaustively stripped and the stripped heavy material is being dumped.

The heavy material will contain between 50 and 75 percent MEP as it enters the stripper and the total flow will amount to approximately 5 percent of the material entering the flash zone. Steam is admitted to the bottom of the said stripper via steam conduits 45. The steam is admitted during the time the heavy material is flowing to said stripper and the stripping started. When the level of crude heavy material has reached the desired level in the stripper, the flow of said material will be switched to the other stripper and the material in the first stripper will be further stripped until less than 5 percent MEP remains in the heavy material. The effluent from said stripper is removed through conduit 46. When the heavy material has been stripped to 5 percent or less MEP, the steam is cut off and the stripped heavy material is dumped through conduits 19. The stripper is then ready for another charge of heavy materials. This final stripping and dumping of the stripper takes place while the second stripper is being filled. During the final stripping in one stripper and the filling of the other stripper, the effluents from both strippers are taken off via conduit 46.

The vaporized MEP is removed from the flash zone 10 via conduit 20. Superheated steam at 1200–1500° F. is admitted to conduit 20 via steam conduit 21 and the resulting mixture is passed over a dehydrogenation catalyst in dehydrogenation zone 22 where the MEP is dehydrogenated to MVP. Some picolines, heavy oils and unreacted MEP will also be present in the resulting MVP. This crude MVP is removed via conduit 23 to waste heat boiler 24. The crude MVP is cooled in the waste heat boiler 24 by giving up some of its heat to water passing through said waste heat boiler, this water being vaporized to 30 pound steam. The crude MVP is not cooled sufficiently to cause condensation. The crude MVP is removed from the waste heat boiler via conduit 25 and is mixed with the effluent from the aforesaid strippers 15 or 16 in conduit 18 and is passed to fractionator 37. MEP effluent from the said fractionator is returned to MEP feed tank 1 via conduit 38. MVP and heavy material is sent via conduit 39 to still 40 where the MVP is distilled off through conduit 41. The heavy bottoms from still 40 is removed via conduit 42. The 30 pound steam system, as shown, is a typical waste heat recovery system and needs no further discussion.

The flow of crude MEP feed from feed tank 1 to heater 4 passes through flow detector 27. Air valve 28 is electrically operatively connected via electrical conduit 43 with flow detector 27 so that valve 28 will open, admitting air pressure to conduit 34 which in turn opens normally closed valve 35, admitting air to conduits 29 and 30 when the flow of material through the detector decreases below a predetermined rate. Valve 35 contains a small bleed hole 36 which prevents air leakage through valve 28 causing the system to be activated. The air pressure in conduit 29 closes gas valve 31, thereby interrupting the flow of gas to burners 9. The air pressure in conduit 30 opens steam valve 32 admitting steam to the heater 9 via conduit 33 and thereby cooling said heater.

Our invention has been described in one of its preferred embodiments. Those skilled in the art will see many changes which can be made without departing from the scope of our invention. For example, the low pressure steam generating system can be eliminated. The steam from such a system can be used for supplying steam to conduits 14, 17 and 33. The pressures and temperatures are not limited to those disclosed, but any pressure and temperature as is known in the art can be employed. There can be several batch strippers instead of the two as shown or a single continuous type stripper can be used. Other coolants and furnaces can be employed.

We claim:
1. An apparatus for preparing crude alkylpyridines for dehydrogenation comprising in combination a feed tank; a heater; conduit means connecting the outlet of said feed tank to the inlet of said heater; a flash evaporator; conduit means connecting the outlet of said heater to the inlet of said flash evaporator; means for admitting steam to said flash evaporator; stripping means; conduit means connecting the lower portion of said flash evaporator to the inlet of said stripping means; means for admitting steam to said stripping means; a dehydrogenation unit; conduit means connecting the upper portion of said flash evaporator to the inlet of said dehydrogenation unit; means for admitting steam to the dehydrogenation unit; a waste heat recovery unit; conduit means connecting the outlet of said dehydrogenation unit to the inlet of said waste heat recovery unit; conduit means leading from said waste heat recovery unit; conduit means connecting the outlet of said stripping means to the said conduit means leading from said waste heat recovery unit; a temperature responsive controller operatively connected to the outlet of aforesaid heater; a fuel conduit and burners operatively connected with said heater; a valve responsive to said controller and operatively connected to said fuel conduit; a steam conduit connected to the burner zone of said heater; a rate of flow detector operatively connected to the aforesaid conduit means connecting the outlet of the feed vessel to the inlet of the heater; a valve in the aforesaid fuel conduit, said last-mentioned valve being operatively connected to said rate of flow detector so that said valve will close when the rate of flow falls below a predetermined rate; and a valve in the aforesaid steam conduit connected to the burner zone, said valve being operatively connected to the said rate of flow detector so as to open when the rate of flow falls below a predetermined rate.

2. An apparatus for preparing crude alkylpyridines for dehydrogenation comprising in combination a feed tank; a heater; conduit means connecting the outlet of said feed tank to the inlet of said heater; a soak vessel; a flash evaporator; conduit means connecting the outlet of said heater to the inlet of said soak vessel; conduit means connecting the outlet of said soak vessel to the inlet of said flash evaporator; means for admitting steam to said flash evaporator; stripping means; conduit means connecting the lower portion of said flash evaporator to the inlet of said stripping means; means for admitting steam to said stripping means; a dehydrogenation unit; conduit means connecting the upper portion of said flash evaporator to the inlet of said dehydrogenation unit; means for admitting steam to the dehydrogenation unit; a waste heat recovery unit; conduit means connecting the outlet of said dehydrogenation unit to the inlet of said waste heat recovery unit; conduit means leading from said waste heat recovery unit; conduit means connecting the outlet of said stripping means to the said conduit means leading from said waste heat recovery unit; a temperature responsive controller operatively connected to the outlet of aforesaid heater; a fuel conduit and burners operatively connected with said heater; a valve responsive to said controller and operatively connected to said fuel conduit; a steam conduit connected to the burner zone of said heater; a rate of flow detector operatively connected to the aforesaid conduit means connecting the outlet of the feed vessel to the inlet of the heater; a valve in the aforesaid fuel conduit, said last-mentioned valve being operatively connected to said rate of flow detector so that said valve will close when the rate of flow falls below a predetermined rate; and a valve in the aforesaid steam conduit connected to the burner zone, said valve being operatively connected to the said rate of flow detector so as to open when the rate of flow falls below a predetermined rate.

3. In a dehydrogenation apparatus comprising in combination a heater, a flash vessel and a dehydrogenation vessel, said heater comprising a plurality of tubes for conveying fluid to be heated through said heater, burners for supplying heat to the exterior of said tubes, a fuel conduit connected to said burners, a feed conduit and an outlet conduit connected to the tubes of said heater, the improvement comprising in combination a steam conduit communicating with the interior of said heater and adapted to apply steam to the exterior of said tubes, an automatic rate of flow detector in the feed conduit of said heater for measuring variations in the rate of flow of the fluid to be heated in said tubes; a control valve means in said fuel conduit, and said valve being operatively connected to the said rate of flow detector so that said valve means will close when the rate of flow of the feed to said heater falls below a predetermined minimum; and a control valve means in the said steam conduit, said valve being operatively connected to the said rate of flow detector so that said valve means will open when the rate of flow reaches the said predetermined minimum.

4. In a heat supply chamber having tubular means for passing a fluid therethrough in indirect heat exchange with a heat source, a safety system comprising in combination automatic means for continuously determining the rate of flow of said fluids through the tubes of said heat supply chamber, means for automatically shutting off said heat source and means for automatically admitting a quench fluid to the interior of said heat supply chamber responsive to said determining means when said rate of flow of said fluids falls below a predetermined minimum.

5. The safety system of claim 4 wherein automatic means are provided to continuously detect the temperature of the fluid leaving the heat exchanger and to automatically regulate the supply of heat source responsive to changes in the detected temperature from a predetermined value.

6. A furnace comprising in combination a plurality of tubes, conduit means for introducing fluid to be heated into said tubes, conduit means for withdrawing heated fluid from said tubes, burner means for supplying heat to the exterior of said tubes, automatic means for continuously detecting flow of fluids introduced into said tubes, and control valve means for simultaneously cutting off the supply of heat and admitting a quench fluid to the exterior of said said tubes automatically responsive to said automatic detecting means when the flow of fluids in said tubes falls below a predetermined minimum.

7. A furnace comprising, in combination, a plurality of tubes within said furnace for conveying a fluid to be heated, burner means within said furnace for heating the exterior of said tubes, conduit means for supplying fuel to said burners, conduit means for introducing fluid to be heated into said tubes and conduit means for removing heated material from said tubes, conduit means communicating with the interior of said furnace adapted to supply a quench fluid to the exterior of said tubes, control valve means in said fuel conduit and in said quench fluid conduit, automatic fluid flow measuring means in said feed conduit to said heater for continuously measuring variations in the rate of flow of said fluid being heated, and means connected to said flow measuring means and said fuel control valve means and said quench fluid control valve means for automatically controlling said fuel control valve and automatically controlling said quench control valve responsive to variations in the rate of flow of said fluid being heated.

References Cited in the file of this patent

UNITED STATES PATENTS

| 1,615,478 | Poole | Jan. 25, 1927 |
| 2,439,023 | Robinson | Apr. 6, 1948 |
| 2,504,172 | Arnold | Apr. 18, 1950 |
| 2,527,430 | Kniveton | Oct. 24, 1950 |

OTHER REFERENCES

Hartz (Petroleum Processing), April 1955, pp. 511-515.